US012748288B2

(12) United States Patent
Lin et al.

(10) Patent No.: US 12,748,288 B2
(45) Date of Patent: Sep. 29, 2026

(54) IMAGING LENS

(71) Applicant: GUANGZHOU LUXVISIONS INNOVATION TECHNOLOGY LIMITED, Guangzhou (CN)

(72) Inventors: Tzu-Yao Lin, Guangzhou (CN); Shih-Chieh Yen, Guangzhou (CN)

(73) Assignee: GUANGZHOU LUXVISIONS INNOVATION TECHNOLOGY LIMITED, Guangzhou (CN)

(*) Notice: Subject to any disclaimer, the term of this patent is extended or adjusted under 35 U.S.C. 154(b) by 241 days.

(21) Appl. No.: 18/646,788

(22) Filed: Apr. 26, 2024

(65) Prior Publication Data

US 2025/0013020 A1 Jan. 9, 2025

(30) Foreign Application Priority Data

Jul. 7, 2023 (CN) ........................ 202310830171.6

(51) Int. Cl.
*G02B 9/60* (2006.01)
*G02B 13/00* (2006.01)

(52) U.S. Cl.
CPC ........... *G02B 13/0065* (2013.01); *G02B 9/60* (2013.01); *G02B 13/0045* (2013.01)

(58) Field of Classification Search
CPC .. G02B 13/0065; G02B 13/0045; G02B 9/60; G02B 5/04; G02B 5/3083
(Continued)

(56) References Cited

U.S. PATENT DOCUMENTS 11,933,949 B2 3/2024 Saiga
12,019,218 B2 * 6/2024 Zhang ................ G02B 13/0065
(Continued)

FOREIGN PATENT DOCUMENTS

CN 103293635 9/2013
CN 107346058 11/2017
(Continued)

OTHER PUBLICATIONS

Yang; Jin et al., "Study on the Design of Prism Hyperspectral Imaging System Based on Off-Axis Two-Mirror Littrow Configuration", Spectroscopy and Spectral Analysis, May 2016, with English abstract, pp. 1537-1542, vol. 36, No. 5.
(Continued)

*Primary Examiner* — William R Alexander
(74) *Attorney, Agent, or Firm* — JCIPRNET

(57) ABSTRACT

An imaging lens sequentially includes a prism, a first lens element, a second lens element, a third lens element, a fourth lens element, and a fifth lens element from an object side to an image side along an optical axis. The prism has a light incident surface. The light incident surface includes at least one phase delay structure being a circle and including a circle center and microstructures. Diopters of the first to fifth lens elements are respectively negative, negative, positive, positive, and negative. A spacing between two adjacent microstructures in a radial direction of the circle is the same. The first to fifth lens elements are aspheric lens elements. The imaging lens satisfies 3.86<TL/ImgH<9.8, where TL is a distance from an object side surface of the first lens element to an image plane on the optical axis, and ImgH is half of a diagonal of the image plane.

9 Claims, 8 Drawing Sheets

(58) Field of Classification Search
USPC .......................................................... 359/714
See application file for complete search history.

(56) References Cited

U.S. PATENT DOCUMENTS

| | | | | |
|---|---|---|---|---|
| 2005/0275948 | A1* | 12/2005 | Sueyoshi | G02B 13/009 359/676 |
| 2006/0017834 | A1 | 1/2006 | Konno et al. | |
| 2006/0056048 | A1 | 3/2006 | Sato et al. | |
| 2006/0092524 | A1 | 5/2006 | Konno | |
| 2007/0065636 | A1* | 3/2007 | Merrill | G02B 5/3083 428/156 |
| 2007/0139786 | A1* | 6/2007 | Iwasawa | G02B 13/007 359/676 |
| 2007/0285520 | A1* | 12/2007 | Kuroda | G02B 27/646 359/683 |
| 2008/0084615 | A1* | 4/2008 | Hankawa | G02B 15/144113 359/683 |
| 2008/0218874 | A1* | 9/2008 | Take | G02B 15/144113 359/676 |
| 2008/0239506 | A1* | 10/2008 | Ori | G02B 15/145113 359/764 |
| 2008/0247053 | A1* | 10/2008 | Iwasawa | G02B 15/145113 359/676 |
| 2009/0303571 | A1* | 12/2009 | Sandstrom | G02B 5/1809 359/291 |
| 2010/0020409 | A1* | 1/2010 | Shinohara | G02B 15/144511 359/683 |
| 2010/0315545 | A1* | 12/2010 | Tamura | G02B 15/144513 359/686 |
| 2010/0322607 | A1* | 12/2010 | Kuroda | G02B 13/009 348/208.11 |
| 2011/0044673 | A1* | 2/2011 | Kawamura | G03B 17/00 359/676 |
| 2011/0134529 | A1* | 6/2011 | Take | G02B 27/646 359/557 |
| 2013/0258162 | A1* | 10/2013 | Tomioka | G02B 15/145113 348/340 |
| 2015/0219915 | A1* | 8/2015 | Hong | G02B 5/3083 359/489.07 |
| 2017/0031137 | A1* | 2/2017 | Shi | G02B 5/20 |
| 2020/0174163 | A1* | 6/2020 | Han | G02B 5/1895 |
| 2021/0318522 | A1* | 10/2021 | Zhang | G02B 13/0045 |
| 2021/0333515 | A1* | 10/2021 | Li | G02B 13/0045 |
| 2021/0333516 | A1* | 10/2021 | Li | G02B 13/0065 |
| 2021/0333517 | A1* | 10/2021 | Li | G02B 13/06 |
| 2023/0375803 | A1* | 11/2023 | Chen | G02B 9/60 |
| 2025/0004172 | A1* | 1/2025 | Takeda | G02B 1/02 |

FOREIGN PATENT DOCUMENTS

| | | |
|---|---|---|
| CN | 109677327 | 4/2019 |
| CN | 112835175 | 5/2021 |
| CN | 114578513 | 6/2022 |
| CN | 115561844 | 1/2023 |
| JP | 2000029098 | 1/2000 |
| JP | 2007133096 | 5/2007 |

OTHER PUBLICATIONS

"Office Action of China Counterpart Application", issued on Jun. 17, 2026, p. 1-p. 7.

* cited by examiner

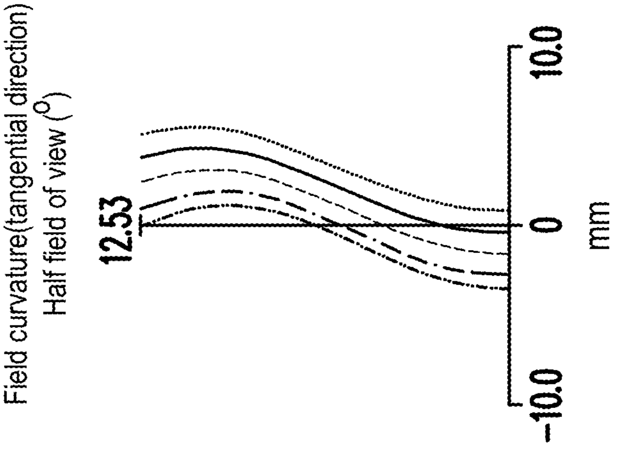
FIG. 1B
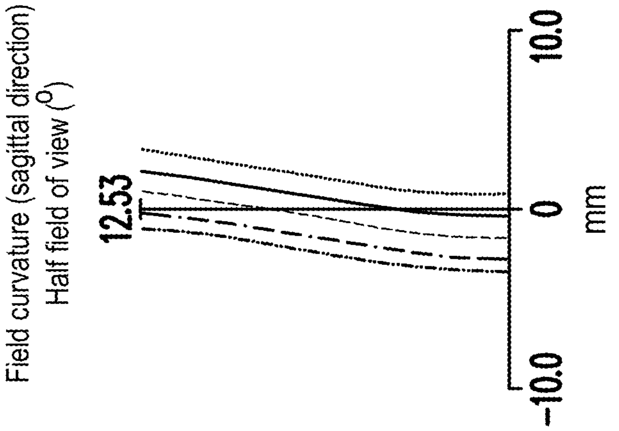
FIG. 1C
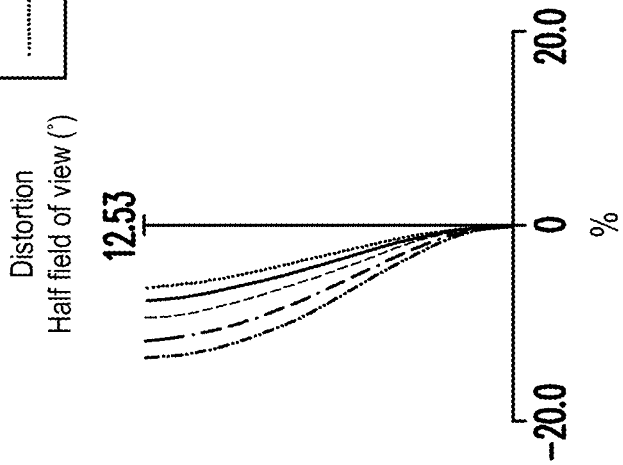
FIG. 1D
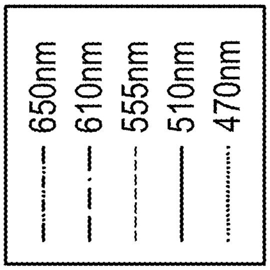

IMAGING LENS

CROSS-REFERENCE TO RELATED APPLICATION

This application claims the priority benefit of China application serial no. 202310830171.6, filed on Jul. 7, 2023. The entirety of the above-mentioned patent application is hereby incorporated by reference herein and made a part of this specification.

BACKGROUND

Technical Field

The disclosure relates to an optical device, and in particular to an imaging lens.

Description of Related Art

Currently, in the camera market, using smartphones to photograph has become mainstream. However, because there are clear limitations on the thickness of smartphones, an imaging lens cannot significantly protrude from the body of the smartphone, so fewer telephoto lenses are used on smartphones. Since a telephoto lens usually requires a long total track length (TTL) to achieve the long focal length, a design with more than seven lens elements causes the smartphone to be very bulky, which does not meet actual requirements. Some smartphones achieve the telephoto effect through digital zoom, which uses a central processing unit (CPU) inside the smartphone to perform computations and directly enlarge each pixel to achieve the effect of zooming in. However, the disadvantage is that an image becomes blurry, causing image quality to deteriorate.

SUMMARY

The disclosure provides an imaging lens, which may be used as a telephoto lens and is small in size.

According to an embodiment of the disclosure, an imaging lens is provided, which sequentially includes a prism, a first lens element, a second lens element, a third lens element, a fourth lens element, and a fifth lens element from an object side to an image side along an optical axis. The prism has a light incident surface. The light incident surface includes at least one phase manipulation structure. The at least one phase manipulation structure is a circle and includes a circle center and multiple microstructures. Diopters of the first lens element, the second lens element, the third lens element, the fourth lens element, and the fifth lens element are respectively negative, negative, positive, positive, and negative. The circle center of the at least one phase manipulation structure is on the optical axis. A spacing between two adjacent microstructures among the microstructures in a radial direction of the circle is the same. The first lens element to the fifth lens element are aspheric lens elements, and the imaging lens satisfies a conditional expression $3.86<TL/ImgH<9.8$, where TL is a distance from an object side surface of the first lens element to an image plane on the optical axis, and ImgH is half of a diagonal of the image plane.

Based on the above, in the embodiments of the disclosure, the technology of metalens element is combined to a periscope lens, and the imaging lens with good optical performance and small size is designed through optical simulation without using digital zoom to implement the optical telephoto lens applicable to smartphones.

In order for the features and advantages of the disclosure to be more comprehensible, the following specific embodiments are described in detail in conjunction with the drawings.

BRIEF DESCRIPTION OF THE DRAWINGS

FIG. 1B and FIG. 1C are schematic views of field curvature of the imaging lens of FIG. 1A, and FIG. 1D is a schematic view of distortion of the imaging lens of FIG. 1A.

DESCRIPTION OF THE EMBODIMENTS

Figure 1A:
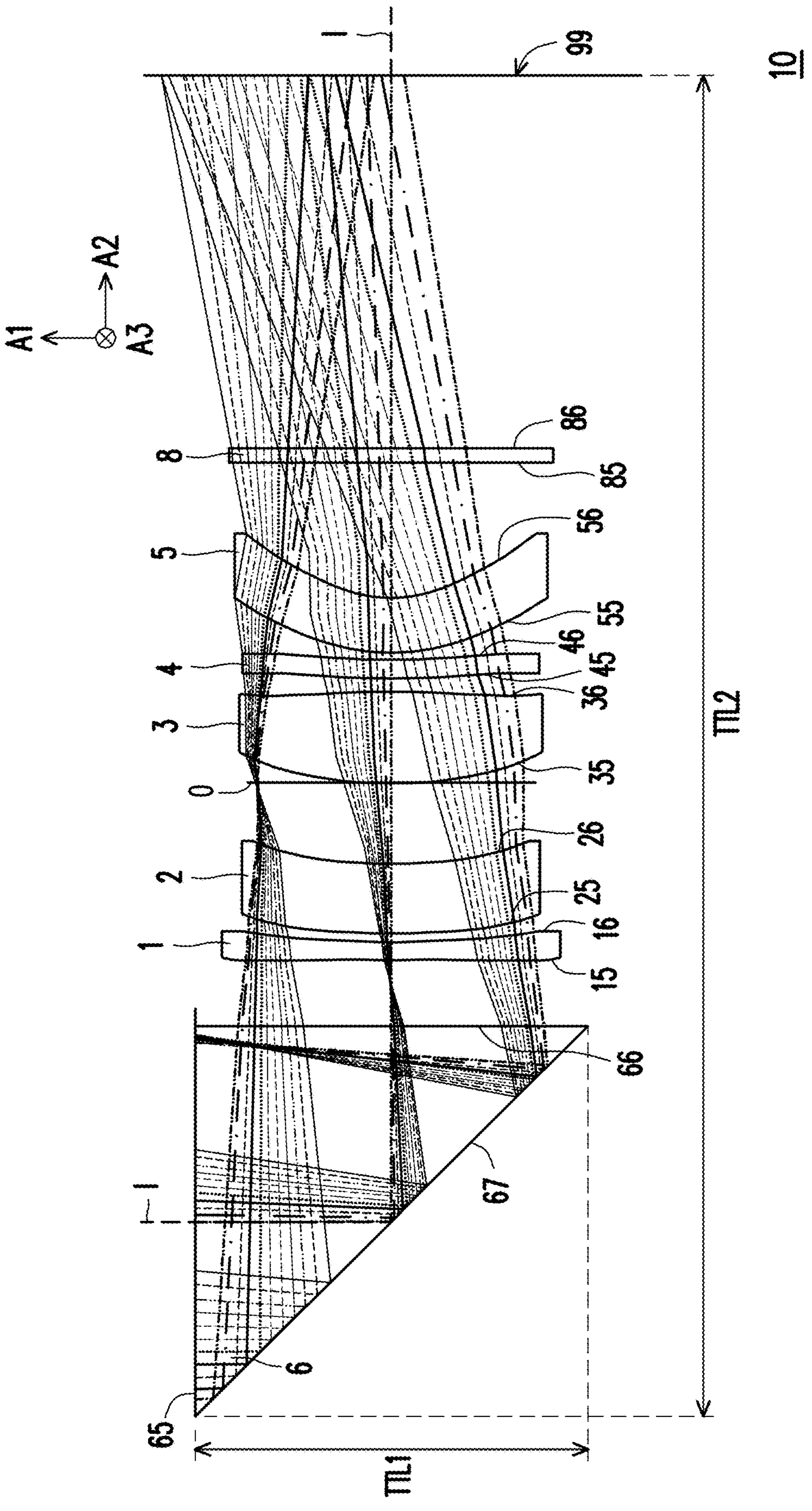
FIG. 1A is a schematic view of an imaging lens according to an embodiment of the disclosure.
Figure 3A:
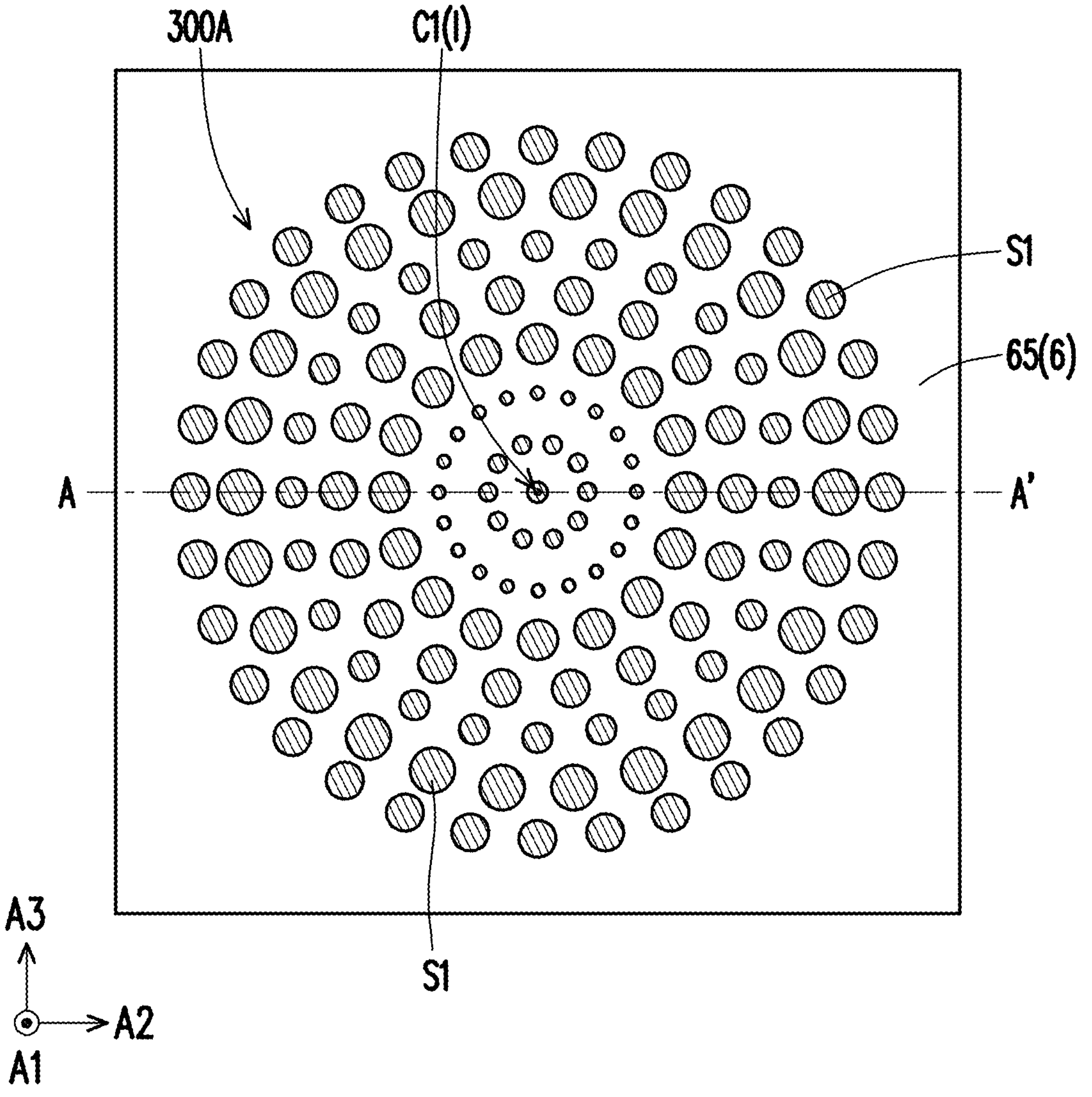
FIG. 3A is a plan schematic view of a phase delay structure according to an embodiment of the disclosure.
Figure 3B:
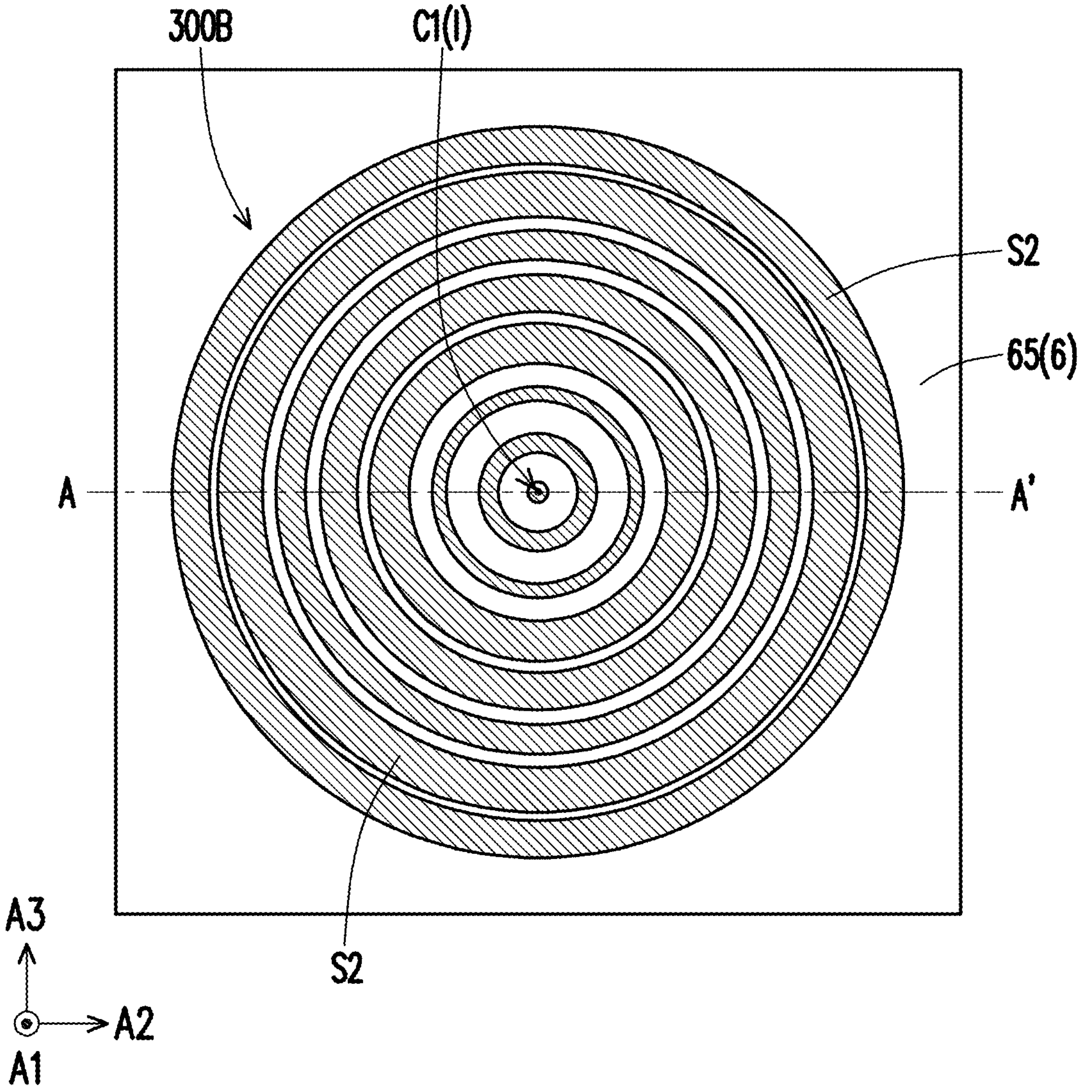
FIG. 3B is a plan schematic view of a phase delay structure according to another embodiment of the disclosure.
Figure 3C:
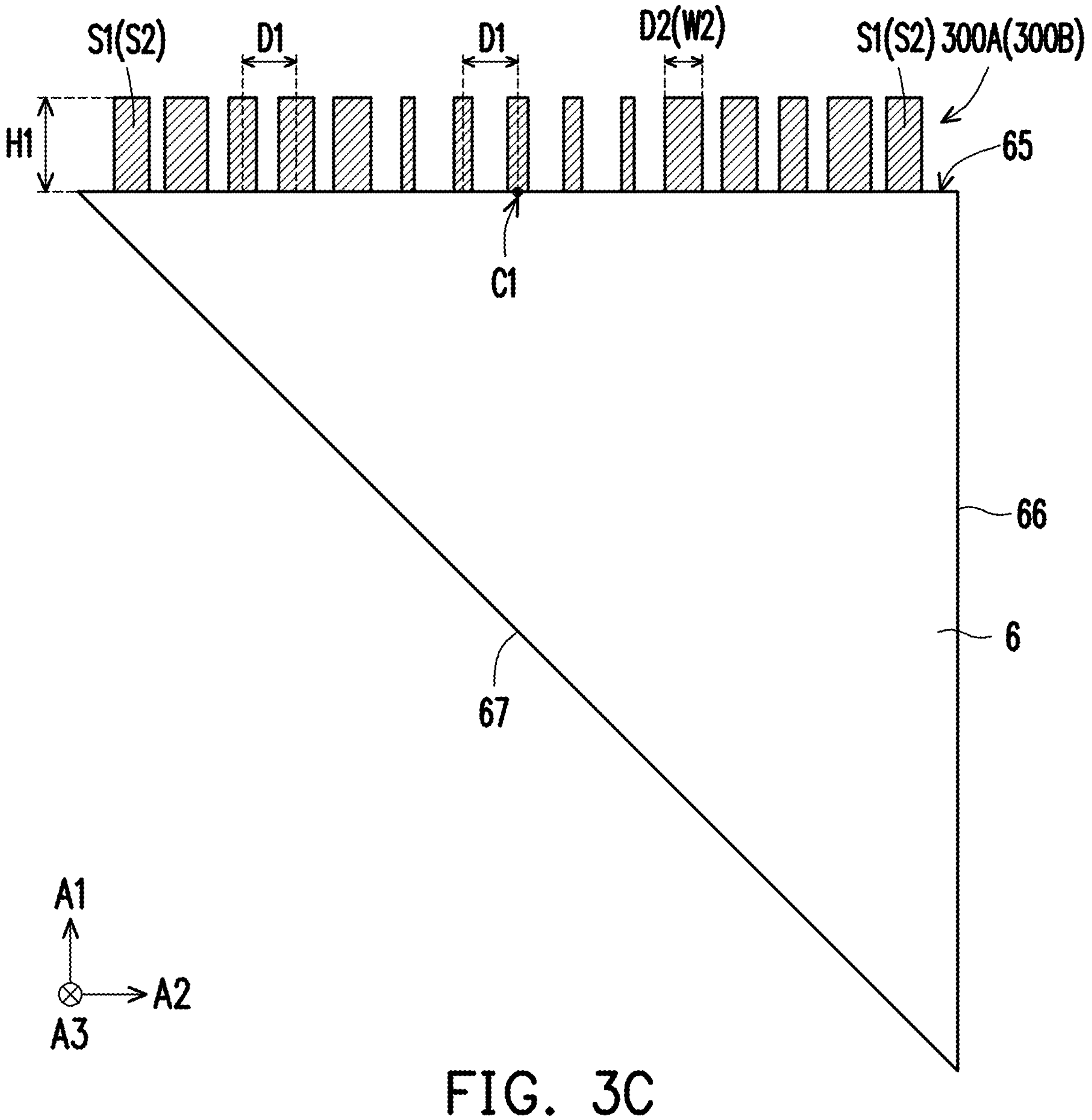
FIG. 3C is a cross-sectional schematic view of a phase delay structure according to an embodiment of the disclosure.

Please refer to FIG. 1A, FIG. 3A, and FIG. 3C at the same time. According to an embodiment of the disclosure, an imaging lens 10 is provided. The imaging lens 10 is a periscope imaging lens, which sequentially includes a prism 6, a lens element 1, a lens element 2, an aperture 0, a lens element 3, a lens element 4, a lens element 5, and a filter 8 from an object side to an image side along an optical axis I. The lens element 1, the lens element 2, the lens element 3, the lens element 4, the lens element 5, and the filter 8 respectively have object side surfaces 15, 25, 35, 45, 55, and 85 allowing imaging light rays to pass through and image side surfaces 16, 26, 36, 46, 56, and 86 allowing imaging light rays to pass through. Diopters of the lens element 1, the lens element 2, the lens element 3, the lens element 4, and the lens element 5 are respectively negative, negative, positive, positive, and negative, and the lens element 1 to the lens element 5 are all aspheric lens elements. The object side is in a positive direction of a direction A1 relative to the imaging lens 10, and the image side is in a positive direction of a direction A2 relative to the imaging lens 10.

After light rays emitted by an object to be captured on the object side enters the imaging lens 10, and sequentially passes through the prism 6, the lens element 1, the lens element 2, the aperture 0, the lens element 3, the lens element 4, the lens element 5, and the filter 8, an image is formed on an image plane 99. The filter 8 is, for example, an infrared cut-off filter, which may allow light rays with appropriate wavelengths (for example, infrared or visible light) to pass through and filter out an infrared waveband that is to be filtered. The filter 8 is disposed between the lens element 5 and the image plane 99.

The prism 6 has a light incident surface 65, a reflection surface 67, and a light emission surface 66. The light rays emitted by the object to be captured enters the prism 6 through the light incident surface 65, is reflected and turned at the reflection surface 67, and is emitted from the prism 6 through the light emission surface 66. The light incident surface 65 includes at least one phase delay structure 300A as shown in FIG. 3A and FIG. 3C, wherein FIG. 3A is a plan schematic view when viewing the prism 6 from the object side of the imaging lens 10, and FIG. 3C is a cross-sectional schematic view along a line segment AA' in FIG. 3A.

Specifically, the phase delay structure 300A is a circle and includes a circle center C1 located on the optical axis I and multiple microstructures S1, wherein the microstructures S1 are cylinders. Among the cylinders S1, the cylinder S1 with the same radial distance from the circle center C1 has the same diameter D2 in a radial direction of the phase delay structure 300A. In other words, the cylinders S1 of the phase delay structure 300A are configured on the light incident surface 65 of the prism 6 in a circularly symmetrical array. In addition, a spacing between two adjacent cylinders S1 in the radial direction of the circle of the phase delay structure 300A is the same. As shown in FIG. 3C, the spacing is D1.

It should be noted that when light (electromagnetic wave) passes through the phase delay structure 300A, the amplitude and the phase of the light are changed due to the array formed by the microstructures S1, thereby changing the traveling direction of the light to achieve the purpose of refraction. Therefore, the phase delay structure 300A may be equivalent to a lens element having diopter. Also, because the cylinders S1 of the phase delay structure 300A are arranged on the light incident surface 65 in a circularly symmetrical array, and the circle center C1 is on the optical axis I, the phase delay structure 300A is equivalent to a lens element with the optical axis I as the axis of symmetry.

It should be noted that since the phase delay structure 300A may be configured on the light incident surface 65 to achieve the purpose of refraction and increase the light entrance amount of the prism 6, the use of one or more lens elements may be omitted. Also, the size of the microstructure S1 is small, so the overall size of the imaging lens 10 is greatly reduced. Furthermore, since the refractivity of the phase delay structure 300A may be changed according to different configurations of the microstructures S1, the imaging lens 10 may have sufficient margin in design.

In the embodiment shown in FIG. 1A, the phase delay structure 300A is a convergent lens element. However, the disclosure is not limited thereto. In other embodiments, the phase delay structure 300A may be a divergent lens element. In some embodiments, each microstructure S1 includes a polymer material or amorphous silicon, but is not limited thereto. In some embodiments not shown, the light incident surface 65 may include multiple phase delay structures 300A, wherein the circle center C1 of one phase delay structure 300A is located on the optical axis I. In some embodiments not shown, the light incident surface 65 may include multiple phase delay structures 300A, the circle center C1 of none of the phase delay structures 300A is located on the optical axis I, and the phase delay structures 300A may have the microstructures S1 with different configurations.

In some embodiments of the disclosure, a height H1 of the microstructure S1 in a normal direction of the light incident surface 65 falls within a range of 0.7 μm to 1.3 μm, a ratio of the height H1 of the microstructure S1 to the diameter D2 in the radial direction of the phase delay structure 300A falls within a range of 2 to 12, a distance between two adjacent microstructures S1 in the radial direction of the circle of the phase delay structure 300A falls within a range of 400 nm to 700 nm, and a distance between two adjacent microstructures S1 with the same radial distance from the circle center C1 of the phase delay structure 300A falls within a range of 400 nm to 700 nm. The refractive index and the extinction coefficient of the phase delay structure 300A at 632.8 nm are respectively 4.5 and 0.24. The binary coefficients of the phase delay structure 300A are shown in Table 1.

TABLE 1

| Wave-length (nm) | Maximum value | $p^2$ | $p^4$ | $p^6$ | $p^8$ |
|---|---|---|---|---|---|
| 532 | 4 | 3.35E+06 | −1.19E+09 | 6.92E+11 | −1.88E+14 |

Figure 4A:
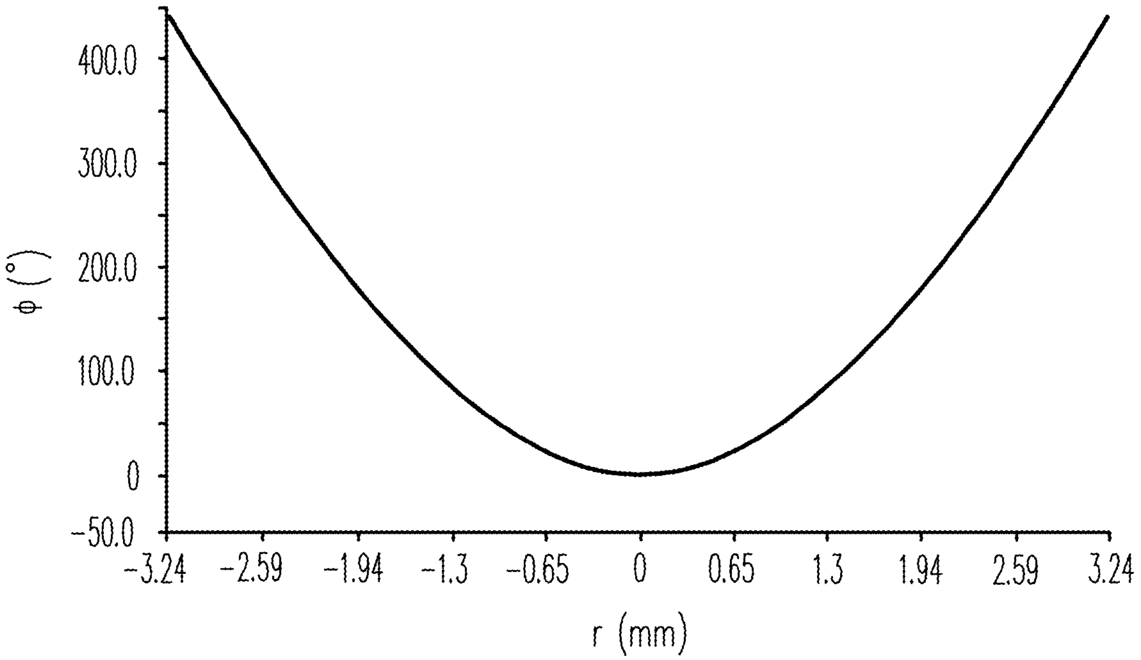
FIG. 4A is a schematic view of a phase delay of a phase delay structure according to an embodiment of the disclosure.

Next, please refer to FIG. 1A, FIG. 3A, FIG. 3C, FIG. 4A, and FIG. 4B at the same time to understand the creative concept of the disclosure. As mentioned before, in the embodiment shown in FIG. 1A, the phase delay structure 300A is used as the convergent lens element. A phase delay distribution diagram of the phase delay structure 300A is as shown in FIG. 4A. Specifically, FIG. 4A is a phase delay p caused by the phase delay structure 300A to light with a wavelength of 532 nm. At a radius r=0 (that is, the circle center C1 of the phase delay structure 300A), the 532 nm light does not undergo phase delay. As the radius r increases (that is, the further away from the circle center C1), the light undergoes a greater phase delay, causing the phase delay structure 300A to have a refracting ability equivalent to one convergent lens element.

Figure 4B:
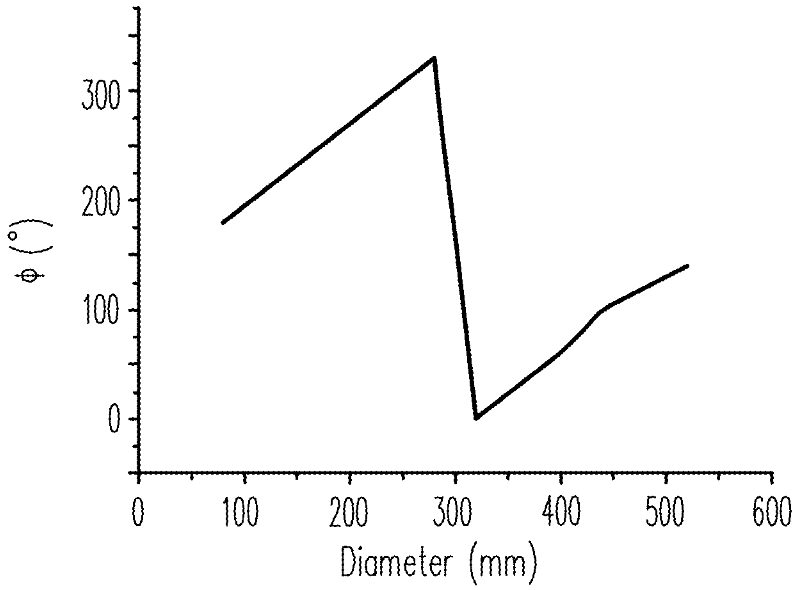
FIG. 4B is a graph of diameter of microstructure versus phase delay according to an embodiment of the disclosure.

In order to achieve the phase delay shown in FIG. 4A, the phase delay structure 300A needs to configure each microstructure S1 according to the graph shown in FIG. 4B. Specifically, in FIG. 4B, the horizontal axis represents the diameter of the microstructure S1 in the radial direction of the phase delay structure 300A (hereinafter referred to as the radial diameter); and the vertical axis represents the phase delay caused by the microstructure S1 to the 532 nm light. Therefore, when a curve shown in FIG. 4A is used as a target curve, the radial diameter of the microstructure S1 at the radius r of the phase delay structure 300A may be determined from a curve of FIG. 4B as the configuration basis of the microstructures S1 of the phase delay structure 300A.

Please refer to FIG. 1A, FIG. 3A, and FIG. 3C again. Other detailed optical data of the embodiment is shown in Table 2, wherein the phase delay structure 300A is referred to as a structure 300A for short.

TABLE 2

| Element | Surface | Radius of curvature (mm) | Spacing (mm) | Refractive index | Abbe number | Focal length (mm) |
|---|---|---|---|---|---|---|
| Prism 6 | Structure 300A | Infinity | 0.00 | 1.54 | 56.00 | |
| | Light incident surface 65 | Infinity | 3 | 1.78 | 25.76 | |
| | Light emission surface 66 | Infinity | 1.00 | | | |
| Lens element 1 | Object side surface 15 | 69.000 | 0.25 | 1.68 | 18.40 | −18.97 |
| | Image side surface 16 | 11.000 | 0.19 | | | |
| Lens element 2 | Object side surface 25 | 16.100 | 1.11 | 1.54 | 56.00 | −68.8 |
| | Image side surface 26 | 10.900 | 1.50 | | | |
| Aperture 0 | | Infinity | 0.00 | | | |
| Lens element 3 | Object side surface 35 | 7.969 | 1.60 | 1.54 | 56.00 | 10.46 |
| | Image side surface 36 | −27.973 | 0.25 | | | |
| Lens element 4 | Object side surface 45 | 16.230 | 0.23 | 1.69 | 18.40 | 44.42 |
| | Image side surface 46 | 30.292 | 0.07 | | | |
| Lens element 5 | Object side surface 55 | 2.415 | 0.99 | 1.54 | 56.00 | −16.96 |
| | Image side surface 56 | 3.023 | 3.10 | | | |
| Filter 8 | Object side surface 85 | Infinity | 0.31 | 1.517 | 64.167 | |
| | Image side surface 86 | Infinity | 5.10 | | | |
| | Image plane 99 | Infinity | | | | |

In Table 2, a spacing of the light incident surface 65 (marked as 3 in Table 2) is the total length of the optical axis I inside the prism 6 in the direction A1 and the direction A2. A spacing of the light emission surface 66 (1.00 mm as shown in Table 2) is a distance between the light emission surface 66 of the prism 6 and the object side surface 15 of the lens element 1 on the optical axis I, that is, a gap between the prism 6 and the lens element 1 on the optical axis I. A height H1 of the phase delay structure 300A in the direction of the optical axis I is very small relative to the sizes of the lens elements 1 to 5, so a spacing thereof is marked as 0.00 mm.

A spacing of the object side surface 15 (0.25 mm as shown in Table 2) is the thickness of the lens element 1 on the optical axis I, and a spacing of the image side surface 16 (0.19 mm as shown in Table 2) is a distance between the image side surface 16 of the lens element 1 and the object side surface 25 of the lens element 2 on the optical axis I, that is, a gap between the lens element 1 and the lens element 2 on the optical axis I, and so on.

As shown in Table 2 and FIG. 1A, the lens element 1 and the lens element 2 of the embodiment are negative meniscus lens elements with convex surfaces facing the prism 6. The lens element 4 is a positive meniscus lens element with a convex surface facing the prism 6. The lens element 3 is a biconvex lens element.

The imaging lens 10 of the embodiment further satisfies a conditional expression 3.86<TL/ImgH<9.8, where TL is a distance from the object side surface 15 of the lens element 1 to the image plane 99 on the optical axis I, and ImgH is half of a diagonal of the image plane 99. A total lens length TTL1 of the imaging lens 10 in the direction A1 is 6 mm, and a total lens length TTL2 in the direction A2 is 20.6 mm. An effective focal length is 14.5 mm, a full field of view angle is 25°, an f-number (f/#) is 2.4, and an image height (half of the diagonal of the image plane 99, ImgH) is 3.8 mm.

In the embodiment, the object side surfaces 15, 25, 35, 45, and 55 of the lens element 1, the lens element 2, the lens element 3, the lens element 4, and the lens element 5 and the image side surfaces 16, 26, 36, 46, and 56 of the lens element 1, the lens element 2, the lens element 3, the lens element 4, and the lens element 5 are all aspheric surfaces, and the aspheric surfaces are defined according to Formula (1) below:

$$Z(Y)=\frac{Y^2}{R}\Bigg/\left(1+\sqrt{1-(1+K)\frac{Y^2}{R^2}}\right)+\sum_{i=1}^{n}a_{2i}\times Y^{2i} \tag{1}$$

Y: a distance between a point on an aspheric curve and the optical axis;

Z: an aspheric depth, that is, a vertical distance between a point on an aspheric surface that is Y from the optical axis and a tangent plane tangent to the vertex of the aspheric surface on the optical axis;

R: a radius of curvature of a lens element surface;

K: a conic constant;

$a_{2i}$: a 2i-th order aspheric coefficient.

The conic constant K and various aspheric coefficients in aspheric Formula (1) above of the embodiment are as shown in Table 3. In Table 3, the number 15 represents the aspheric coefficient of the object side surface 15 of the lens element 1, the number 16 represents the aspheric coefficient of the image side surface 16 of the lens element 1, and so on for other numbers.

TABLE 3

| Surface | K | $a_4$ | $a_6$ | $a_8$ | $a_{10}$ |
|---|---|---|---|---|---|
| 15 | 0.00E+00 | −1.54E−02 | 7.70E−03 | −1.69E−03 | 2.18E−04 |
| 16 | 0.00E+00 | −2.44E−02 | 1.38E−02 | −3.88E−03 | 5.85E−04 |
| 25 | 0.00E+00 | 1.46E−03 | 6.13E−03 | −2.32E−03 | 3.49E−04 |
| 26 | 0.00E+00 | 9.08E−03 | −6.87E−04 | 9.17E−05 | −4.96E−05 |
| 35 | 0.00E+00 | 2.21E−01 | 4.78E−02 | 1.56E−03 | −1.97E−03 |
| 36 | 0.00E+00 | 3.43E−01 | 1.25E−01 | −2.25E−02 | −1.06E−02 |
| 45 | 0.00E+00 | −6.81E−02 | 3.13E−02 | 3.21E−02 | −4.51E−03 |
| 46 | 0.00E+00 | −3.40E−02 | −4.25E−02 | 4.86E−02 | −1.44E−02 |
| 55 | 0.00E+00 | −5.30E−01 | 4.67E−05 | 1.45E−02 | −1.11E−02 |
| 56 | 0.00E+00 | −5.47E−02 | 4.90E−02 | −2.58E−03 | −1.91E−03 |

| Surface | $a_{12}$ | $a_{14}$ | $a_{16}$ | $a_{18}$ | $a_{20}$ |
|---|---|---|---|---|---|
| 15 | −1.23E−05 | 1.58E−08 | 1.74E−08 | 0.00E+00 | 0.00E+00 |
| 16 | −4.12E−05 | 1.03E−06 | 2.50E−09 | 0.00E+00 | 0.00E+00 |
| 25 | −1.90E−05 | −2.07E−08 | 1.36E−08 | 0.00E+00 | 0.00E+00 |
| 26 | 3.15E−06 | 1.45E−06 | −1.82E−07 | 0.00E+00 | 0.00E+00 |
| 35 | −1.11E−03 | 1.07E−03 | 4.46E−04 | 0.00E+00 | 0.00E+00 |
| 36 | −1.33E−02 | −1.32E−03 | −3.60E−03 | 0.00E+00 | 0.00E+00 |
| 45 | −2.89E−03 | −9.40E−04 | −3.85E−03 | 4.54E−03 | 8.80E−04 |
| 46 | 4.50E−03 | −4.18E−03 | −3.80E−03 | 6.60E−04 | 4.33E−05 |
| 55 | 3.81E−03 | −2.72E−03 | 3.91E−04 | −2.41E−05 | −9.15E−05 |
| 56 | −2.32E−03 | −9.75E−04 | −4.37E−04 | −2.47E−04 | −1.29E−04 |

Also referring to FIG. 1B to FIG. 1D, FIG. 1B shows a graph of field curvature aberration in a tangential direction when light with wavelengths of 470 nm, 510 nm, 555 nm, 610 nm, and 650 nm respectively enters the imaging lens 10 of the embodiment, FIG. 1C shows a graph of field curvature aberration in a sagittal direction when light with wavelengths of 470 nm, 510 nm, 555 nm, 610 nm, and 650 nm respectively enters the imaging lens 10 of the embodiment, and FIG. 1D shows a graph of distortion when light with wavelengths of 470 nm, 510 nm, 555 nm, 610 nm, and 650 nm respectively enters the imaging lens 10 of the embodiment.

As shown in the field curvature aberration graphs of FIG. 1B and FIG. 1C, the field curvature aberrations of the five representative wavelengths in the entire field of view range fall within ±6.0 mm, indicating that the imaging lens 10 of the embodiment can effectively eliminate the field curvature aberrations. As shown in the distortion graph of FIG. 1D, the distortion aberrations of the five representative wavelengths in the entire field of view range are less than ±16%, indicating that the imaging lens 10 of the embodiment has good imaging quality.

Next, please refer to FIG. 3B and FIG. 3C. In an embodiment, the phase delay structure 300A of the above embodiment may be changed to a phase delay structure 300B shown in FIG. 3B and FIG. 3C, wherein the only difference between the phase delay structure 300A and the phase delay structure 300B is that a microstructure S2 is a ring instead of a cylinder. When a width W2 of each microstructure S2 in a radial direction of the phase delay structure 300B is the same as the diameter D2 of each corresponding microstructure S1 in the radial direction of the phase delay structure 300A, the phase delay structure 300B and the phase delay structure 300A have the same optical properties. Therefore, when the phase delay structure 300B is disposed on the light incident surface 65 of the prism 6 in FIG. 1A, the imaging lens 10 has the same optical performance, which will not be described again.

In some embodiments, a ratio of the height H1 of each microstructure S2 to the width W2 in the radial direction of the phase delay structure 300B falls within a range of 2 to 12. In some embodiments, a distance between two adjacent microstructures S2 among the microstructures S2 in the radial direction of the phase delay structure 300B falls within a range of 400 nm to 700 nm.

In order to fully explain various embodiments of the disclosure, other embodiments of the disclosure are described below. It must be noted here that the following embodiments continue to use the reference numerals and some content of the above embodiments, wherein the same numerals are adopted to represent the same or similar elements, and the description of the same technical content is omitted. For the description of the omitted part, reference may be made to the above embodiments and will not be repeated in the following embodiments.

Figure 2A:
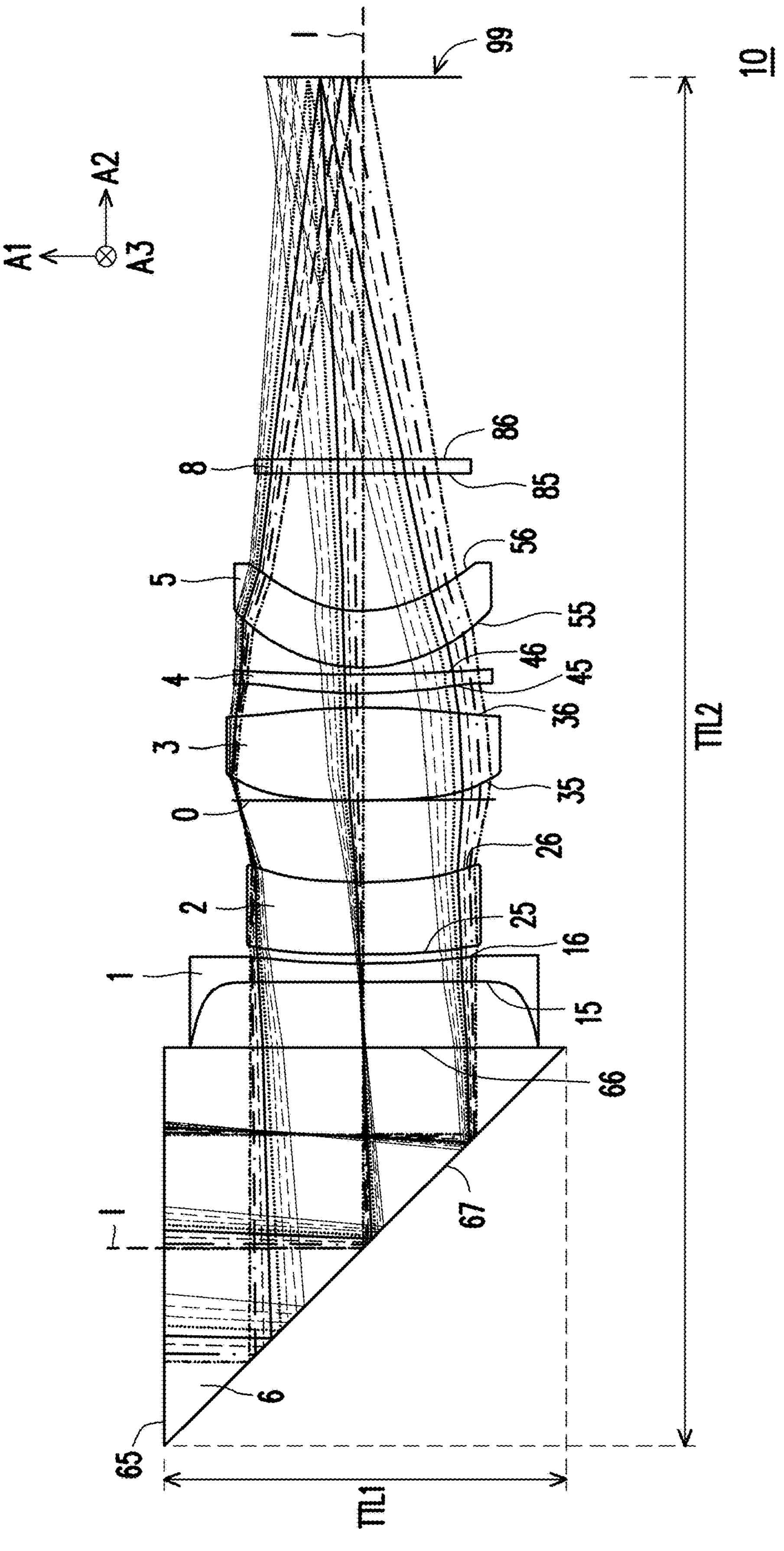
FIG. 2A is a schematic view of an imaging lens according to an embodiment of the disclosure.

Please refer to FIG. 2A, FIG. 3A, and FIG. 3C first at the same time. According to an embodiment of the disclosure, an imaging lens 10 is provided. The imaging lens 10 is a periscope imaging lens, which sequentially includes a prism 6, a lens element 1, a lens element 2, an aperture 0, a lens element 3, a lens element 4, a lens element 5, and a filter 8 from an object side to an image side along an optical axis I. The lens element 1, the lens element 2, the lens element 3, the lens element 4, the lens element 5, and the filter 8 respectively have object side surfaces 15, 25, 35, 45, 55, and 85 allowing imaging light rays to pass through and image side surfaces 16, 26, 36, 46, 56, and 86 allowing imaging light rays to pass through. Diopters of the lens element 1, the lens element 2, the lens element 3, the lens element 4, and the lens element 5 are respectively negative, negative, positive, positive, and negative, and the lens element 1 to the lens element 5 are all aspheric lens elements. The object side is in a positive direction of a direction A1 relative to the imaging lens 10, and the image side is in a positive direction of a direction A2 relative to the imaging lens 10.

After light rays emitted by an object to be captured on the object side enters the imaging lens 10, and sequentially passes through the prism 6, the lens element 1, the lens element 2, the aperture 0, the lens element 3, the lens element 4, the lens element 5, and the filter 8, an image is formed on an image plane 99.

The prism 6 has a light incident surface 65, a reflection surface 67, and a light emission surface 66. The light rays emitted by the object to be captured enters the prism 6 through the light incident surface 65, is reflected and turned at the reflection surface 67, and is emitted from the prism 6 through the light emission surface 66. The light incident surface 65 includes at least one phase delay structure 300A as shown in FIG. 3A and FIG. 3C, wherein FIG. 3A is a plan schematic view when viewing the prism 6 from the object side of the imaging lens 10, and FIG. 3C is a cross-sectional schematic view along a line segment AA' in FIG. 3A.

Other detailed optical data of the embodiment is shown in Table 4, wherein the phase delay structure 300A is referred to as a structure 300A for short.

TABLE 4

| Element | Surface | Radius of curvature (mm) | Spacing (mm) | Refractive index | Abbe number | Focal length (mm) |
|---|---|---|---|---|---|---|
| Prism 6 | Structure 300A | Infinity | 0.00 | 1.54 | 56.00 | |
| | Light incident surface 65 | Infinity | 3 | 1.78 | 25.76 | |
| | Light emission surface 66 | Infinity | 1.00 | | | |
| Lens element 1 | Object side surface 15 | 117.800 | 0.25 | 1.68 | 18.40 | −16.21 |
| | Image side surface 16 | 10.100 | 0.19 | | | |
| Lens element 2 | Object side surface 25 | 17.000 | 1.11 | 1.54 | 56.00 | −40.42 |
| | Image side surface 26 | 9.400 | 1.50 | | | |
| Aperture 0 | | Infinity | 0.00 | | | |
| Lens element 3 | Object side surface 35 | 7.060 | 1.60 | 1.54 | 56.00 | 9.85 |
| | Image side surface 36 | −20.800 | 0.25 | | | |
| Lens element 4 | Object side surface 45 | 7.450 | 0.23 | 1.69 | 18.40 | 12.14 |
| | Image side surface 46 | 61.100 | 0.07 | | | |
| Lens element 5 | Object side surface 55 | 2.610 | 0.99 | 1.54 | 56.00 | −44.05 |
| | Image side surface 56 | 2.083 | 3.10 | | | |
| Filter 8 | Object side surface 85 | Infinity | 0.31 | 1.517 | 64.167 | |
| | Image side surface 86 | Infinity | 5.10 | | | |
| | Image plane 99 | Infinity | | | | |

In Table 4, a spacing of the light incident surface 65 (marked as 3 in Table 4) is the total length of the optical axis I inside the prism 6 in the direction A1 and the direction A2. A spacing of the light emission surface 66 (1.00 mm as shown in Table 4) is a distance between the light emission surface 66 of the prism 6 and the object side surface 15 of the lens element 1 on the optical axis I, that is, a gap between the prism 6 and the lens element 1 on the optical axis I. A height H1 of the phase delay structure 300A in the direction of the optical axis I is very small relative to the sizes of the lens elements 1 to 5, so a spacing thereof is marked as 0.00 mm.

A spacing of the object side surface 15 (0.25 mm as shown in Table 4) is the thickness of the lens element 1 on the optical axis I, and a spacing of the image side surface 16 (0.19 mm as shown in Table 4) is a distance between the image side surface 16 of the lens element 1 and the object side surface 25 of the lens element 2 on the optical axis I, that is, a gap between the lens element 1 and the lens element 2 on the optical axis I, and so on.

As shown in Table 4 and FIG. 2A, the lens element 1 and the lens element 2 of the embodiment are negative meniscus lens elements with convex surfaces facing the prism 6. The lens element 4 is a positive meniscus lens element with a convex surface facing the prism 6. The lens element 3 is a biconvex lens element.

The imaging lens 10 of the embodiment further satisfies a conditional expression 3.86<TL/ImgH<9.8, where TL is a distance from the object side surface 15 of the lens element 1 to the image plane 99 on the optical axis I, and ImgH is half of a diagonal of the image plane 99.

A total lens length TTL1 of the imaging lens 10 in the direction A1 is 6 mm, and a total lens length TTL2 in the direction A2 is 20.6 mm. An effective focal length is 8.5 mm, a full field of view angle is 18°, an f-number (f/#) is 2.4, and an image height is 1.5 mm. In some embodiments, the field of view angle of the imaging lens 10 falls within a range of 15 degrees to 25 degrees.

In the embodiment, the object side surfaces 15, 25, 35, 45, and 55 of the lens element 1, the lens element 2, the lens element 3, the lens element 4, and the lens element 5 and the image side surfaces of the lens element 1, the lens element 2, the lens element 3, the lens element 4, and the lens element 5 16, 26, 36, 46, and 56 are all aspheric surfaces, and the aspheric surfaces are defined according to Formula (1) above. The conic constant K and various aspheric coefficients are shown in Table 5. The number 15 in Table 5 represents the aspheric coefficient of the object side surface 15 of the lens element 1, the number 16 represents the aspheric coefficient of the image side surface 16 of the lens element 1, and so on for other numbers.

TABLE 5

| Surface | K | $a_4$ | $a_6$ | $a_8$ | $a_{10}$ |
|---|---|---|---|---|---|
| 15 | 0.00E+00 | −1.56E−02 | 6.52E−03 | −1.43E−03 | 1.85E−04 |
| 16 | 0.00E+00 | −2.47E−02 | 1.17E−02 | −3.29E−03 | 4.95E−04 |
| 25 | 0.00E+00 | 1.48E−03 | 5.19E−03 | −1.96E−03 | 2.96E−04 |
| 26 | 0.00E+00 | 9.22E−03 | −5.81E−04 | 7.76E−05 | −4.20E−05 |
| 35 | 0.00E+00 | 2.25E−01 | 4.04E−02 | 1.32E−03 | −1.67E−03 |
| 36 | 0.00E+00 | 3.48E−01 | 1.05E−01 | −1.90E−02 | −9.00E−03 |
| 45 | 0.00E+00 | −6.91E−02 | 2.65E−02 | 2.71E−02 | −3.82E−03 |
| 46 | 0.00E+00 | −3.45E−02 | −3.60E−02 | 4.11E−02 | −1.22E−02 |
| 55 | 0.00E+00 | −5.38E−01 | 3.96E−05 | 1.22E−02 | −9.39E−03 |
| 56 | 0.00E+00 | −5.55E−02 | 4.14E−02 | −2.18E−03 | −1.62E−03 |

| Surface | $a_{12}$ | $a_{14}$ | $a_{16}$ | $a_{18}$ | $a_{20}$ |
|---|---|---|---|---|---|
| 15 | −1.04E−05 | 1.34E−08 | 1.47E−08 | 0.00E+00 | 0.00E+00 |
| 16 | −3.49E−05 | 8.72E−07 | 2.11E−09 | 0.00E+00 | 0.00E+00 |
| 25 | −1.61E−05 | −1.75E−08 | 1.15E−08 | 0.00E+00 | 0.00E+00 |
| 26 | 2.67E−06 | 1.23E−06 | −1.54E−07 | 0.00E+00 | 0.00E+00 |
| 35 | −9.37E−04 | 9.08E−04 | 3.77E−04 | 0.00E+00 | 0.00E+00 |
| 36 | −1.13E−02 | −1.12E−03 | −3.05E−03 | 0.00E+00 | 0.00E+00 |
| 45 | −2.45E−03 | −7.95E−04 | −3.26E−03 | 3.85E−03 | 7.45E−04 |
| 46 | 3.81E−03 | −3.54E−03 | −3.22E−03 | 5.59E−04 | 3.67E−05 |
| 55 | 3.22E−03 | −2.30E−03 | 3.31E−04 | −2.04E−05 | −7.74E−05 |
| 56 | −1.97E−03 | −8.25E−04 | −3.70E−04 | −2.09E−04 | −1.09E−04 |

Figure 2B:
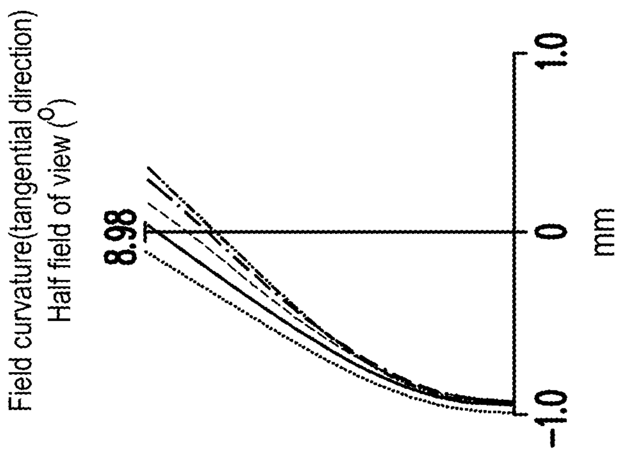
FIG. 2B and FIG. 2C are schematic views of field curvature of the imaging lens of FIG. 2A.
Figure 2C:
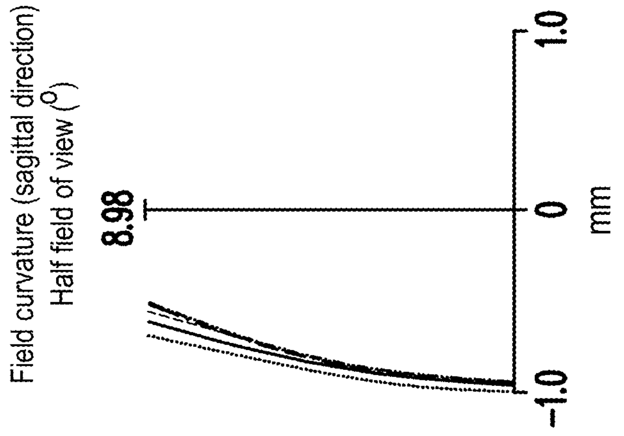
Figure 2D:
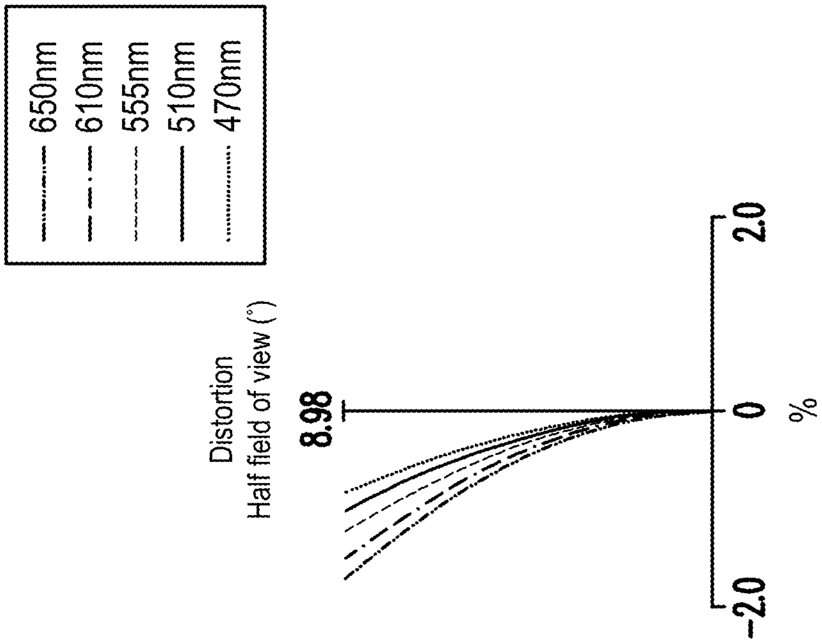
FIG. 2D is a schematic view of distortion of the imaging lens of FIG. 2A.

Also referring to FIG. 2B to FIG. 2D, FIG. 2B shows a graph of field curvature aberration in a tangential direction when light with wavelengths of 470 nm, 510 nm, 555 nm, 610 nm, and 650 nm respectively enters the imaging lens 10 of the embodiment, FIG. 2C shows a graph of field curvature aberration in a sagittal direction when light with wavelengths of 470 nm, 510 nm, 555 nm, 610 nm, and 650 nm respectively enters the imaging lens 10 of the embodiment, and FIG. 2D shows a graph of distortion when light with wavelengths of 470 nm, 510 nm, 555 nm, 610 nm, and 650 nm respectively enters the imaging lens 10 of the embodiment.

As shown in the field curvature aberration graphs of FIG. 2B and FIG. 2C, the field curvature aberrations of the five representative wavelengths in the entire field of view range fall within ±1.0 mm, indicating that the imaging lens 10 of the embodiment can effectively eliminate the field curvature aberrations. As shown in the distortion graph of FIG. 2D, the distortion aberrations of the five representative wavelengths in the entire field of view range are less than ±2%, indicating that the imaging lens 10 of the embodiment has good imaging quality.

Next, please refer to FIG. 3B and FIG. 3C. In an embodiment, the phase delay structure 300A of the above embodiment may be changed to a phase delay structure 300B shown in FIG. 3B and FIG. 3C, wherein the only difference between the phase delay structure 300A and the phase delay structure 300B is that a microstructure S2 is a ring instead of a cylinder. When a width W2 of each microstructure S2 in a radial direction of the phase delay structure 300B is the same as the diameter D2 of each corresponding microstructure S1 in the radial direction of the phase delay structure 300A, the phase delay structure 300B and the phase delay structure 300A have the same optical properties. Therefore, when the phase delay structure 300B is disposed on the light incident surface 65 of the prism 6 in FIG. 2A, the imaging lens 10 has the same optical performance, which will not be described again.

Based on the above, in the embodiments of the disclosure, the technology of meta lens element is combined to a periscope lens, and the imaging lens with good optical performance and small size is designed through optical simulation without using digital zoom to implement an optical telephoto lens applicable to smartphones.

What is claimed is:

1. An imaging lens, sequentially comprising from an object side to an image side along an optical axis:

a prism, having a light incident surface, wherein the light incident surface comprises at least one phase delay structure, and the at least one phase delay structure is a circle and comprises a circle center and a plurality of microstructures;

a first lens element, having a negative diopter;

a second lens element, having a negative diopter;

a third lens element, having a positive diopter;

a fourth lens element, having a positive diopter; and a fifth lens element, having a negative diopter, wherein the circle center of the at least one phase delay structure is on the optical axis, and a spacing between two adjacent microstructures among the microstructures of the at least one phase delay structure in a radial direction of the circle is the same, the first lens element to the fifth lens element are aspheric lens elements, and the imaging lens satisfies a conditional expression $3.86<TL/ImgH<9.8$, where TL is a distance from an object side surface of the first lens element to an image plane on the optical axis, and ImgH is half of a diagonal of the image plane, wherein the microstructures are a plurality of rings, a distance between two adjacent rings among the rings in the radial direction of the circle falls within a range of 400 nm to 700 nm.

2. The imaging lens according to claim 1, wherein the at least one phase delay structure is a convergent lens element.

3. The imaging lens according to claim 1, wherein a ratio of a height of the rings to a width of the rings in the radial direction falls within a range of 2 to 12.

4. The imaging lens according to claim 1, wherein a field of view angle of the imaging lens falls within a range of 15 degrees to 25 degrees.

5. The imaging lens according to claim 1, wherein the first lens element and the second lens element are negative meniscus lens elements with convex surfaces facing the prism.

6. The imaging lens according to claim 1, wherein the fourth lens element is a positive meniscus lens element with a convex surface facing the prism.

7. The imaging lens according to claim 1, wherein the third lens element is a biconvex lens element.

8. An imaging lens, sequentially comprising from an object side to an image side along an optical axis:

a prism, having a light incident surface, wherein the light incident surface comprises at least one phase delay structure, and the at least one phase delay structure is a circle and comprises a circle center and a plurality of microstructures;

a first lens element, having a negative diopter;

a second lens element, having a negative diopter;

a third lens element, having a positive diopter;

a fourth lens element, having a positive diopter; and a fifth lens element, having a negative diopter, wherein the circle center of the at least one phase delay structure is on the optical axis, and a spacing between two adjacent microstructures among the microstructures of the at least one phase delay structure in a radial direction of the circle is the same, the first lens element to the fifth lens element are aspheric lens elements, and the imaging lens satisfies a conditional expression $3.86<TL/ImgH<9.8$, where TL is a distance from an object side surface of the first lens element to an image plane on the optical axis, and ImgH is half of a diagonal of the image plane, the microstructures are a plurality of cylinders, and a diameter of a cylinder with a same radial distance from the circle center among the cylinders in the radial direction is the same, and wherein a distance between two adjacent cylinders among the cylinders in the radial direction of the circle falls within a range of 400 nm to 700 nm.

9. An imaging lens, sequentially comprising from an object side to an image side along an optical axis:

a prism, having a light incident surface, wherein the light incident surface comprises at least one phase delay structure, and the at least one phase delay structure is a circle and comprises a circle center and a plurality of microstructures;

a first lens element, having a negative diopter;

a second lens element, having a negative diopter;

a third lens element, having a positive diopter;

a fourth lens element, having a positive diopter; and a fifth lens element, having a negative diopter, wherein the circle center of the at least one phase delay structure is on the optical axis, and a spacing between two adjacent microstructures among the microstructures of the at least one phase delay structure in a radial direction of the circle is the same, the first lens element to the fifth lens element are aspheric lens elements, and the imaging lens satisfies a conditional expression $3.86<TL/ImgH<9.8$, where TL is a distance from an object side surface of the first lens element to an image plane on the optical axis, and ImgH is half of a diagonal of the image plane, the microstructures are a plurality of cylinders, and a diameter of a cylinder with a same radial distance from the circle center among the cylinders in the radial direction is the same, and wherein a distance between two adjacent cylinders with the same radial distance from the circle center among the cylinders falls within a range of 400 nm to 700 nm.

* * * * *